United States Patent Office 2,802,109
Patented Aug. 6, 1957

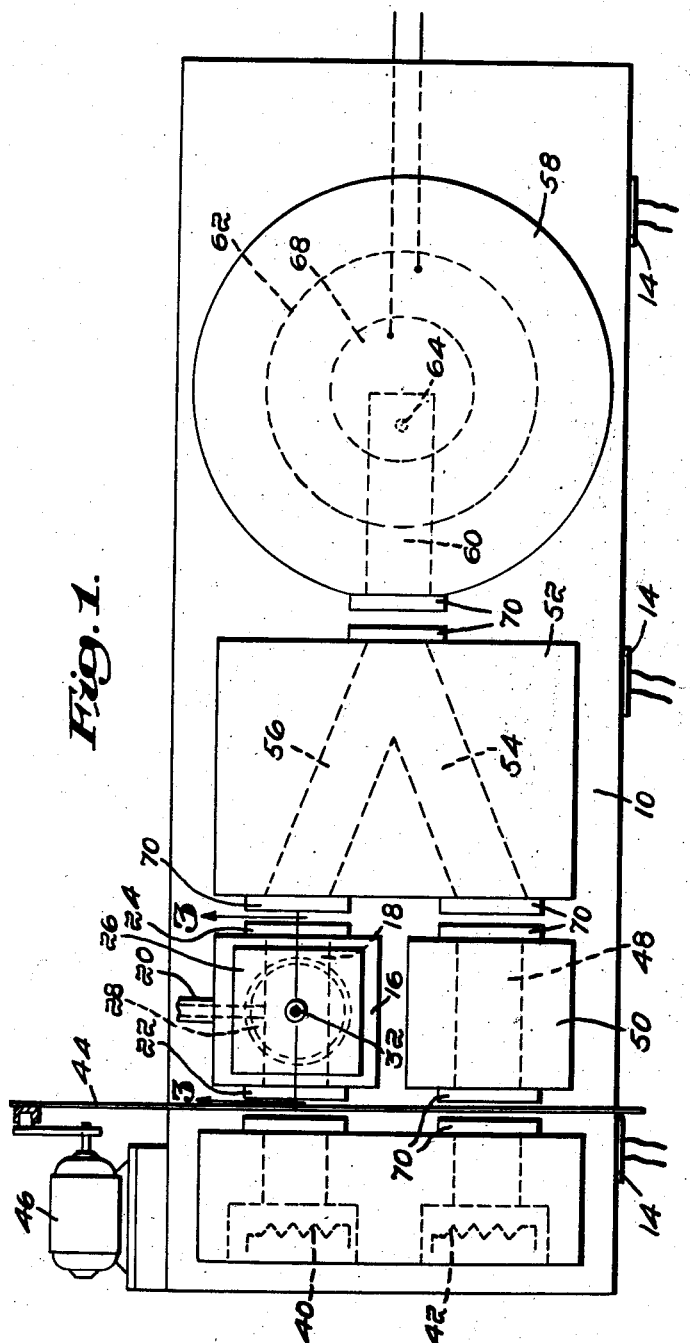

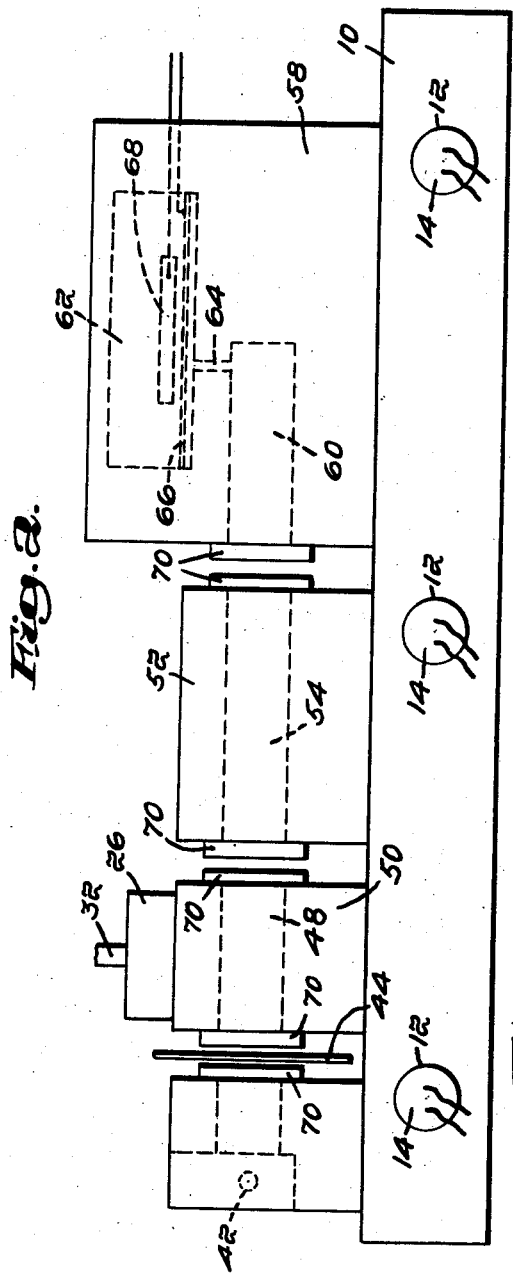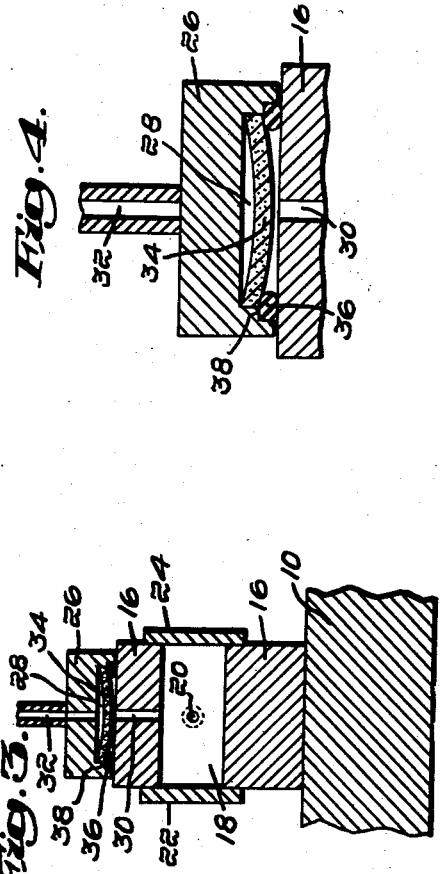

2,802,109

GAS ANALYSIS APPARATUS

James L. Waters, Framingham, Mass., assignor to James L. Waters, Inc., Framingham, Mass., a corporation of Massachusetts Application January 12, 1954, Serial No. 403,525

10 Claims. (Cl. 250—43.5)

This invention relates to gas analysis apparatus wherein gas is subjected to measurement in an analysis cell, and more particularly to heat exchanging means in such apparatus whereby gas to be analyzed may be supplied to said analysis cell at predetermined temperature.

In the analysis of gases by various known methods, it is desirable that the gas to be analyzed be at predetermined temperature and pressure, and hence at predetermined density. In the continuous analysis of gases, wherein the gas is continuously passed through an analysis cell, it is particularly desirable to supply to the analysis apparatus a stream of gas under known and controlled conditions.

The invention is applicable to, and is herein illustrated as embodied in, gas analysis apparatus wherein infra-red radiation is caused to travel along two paths and is caused to traverse a cell containing the gas to be analyzed in one of said paths, and wherein the gas in said analysis cell affects the relative intensity of the beams. The gas is ordinarily continuously passed through said analysis cell. An advantageous mode of analysis of this type is described in Patent No. 2,648,775 granted August 11, 1953.

This invention provides, in gas analysis apparatus wherein gas may be continuously subjected to measurement in an analysis cell, compact and effective means for supplying gas to be analyzed to said analysis cell at predetermined temperature. This means affords rapid heat exchange to bring the analysis gas to predetermined temperature without impairing the ability of the analysis instrument to respond rapidly to changes in composition of the analysis gas and without causing a consequential decrease in the pressure of the analysis gas.

While the means of this invention is ordinarily arranged to increase the temperature of, or to pre-heat, the gas to be analyzed, it may, by reason of its heat-interchanging character, be arranged to decrease the temperature of the gas.

In the drawings, illustrating a specific embodiment of the invention:

Figure 1 is a top plan view of gas analysis apparatus embodying means according to this invention for supplying gas to be analyzed to the analysis cell of the apparatus at predetermined temperature;

Fig. 2 is a side elevation of the structure shown in Fig. 1;

Fig. 3 is a vertical longitudinal section taken on line 3—3 of Fig. 1; and

Fig. 4 is an enlarged view of the upper portion of Fig. 3.

The apparatus illustrated is shown as provided with a massive base 10 of generally rectangular character. The base 10 is conveniently of aluminum, which has high heat conductivity, and because of its massive character, is maintainable at a uniform elevated temperature. Base 10 is shown as provided with apertures 12, which are arranged to receive electrical heating units 14. Thermostat means of conventional character (not shown) may be associated with heating units 14 to maintain them at predetermined uniform temperature.

On the base 10 is disposed metal block 16, of stainless steel, which is shaped to enclose analysis cell 18 wherein the gas is subjected to measurement. Block 16 is secured to base 10 by suitable mechanical fastening (not shown) whereby the block is in thermal contact with the base. Gas outlet 20 communicates with analysis cell 18, and windows 22 and 24, of infra-red transmitting material such as calcium fluoride, seal the ends of cell 18.

Mechanically secured to the block 16, and in thermal contact therewith is metal section 26, also of stainless steel. Block 16 and section 26 cooperate to enclose preheating or heat exchanging chamber 28, shown as circular in horizontal section. Chamber 28 communicates with analysis cell 18 through passage 30, and receives gas through inlet 32.

Within the chamber 28 is porous partition 34 of relatively good heat conductivity, preferably of sintered stainless steel. Partition 34 is illustrated in the form of a relatively thin circular disk extending transversely across the chamber 28 with its peripheral portions in thermal contact with the metal defining the chamber. Disk-shaped partition 34 is shown as uniform in thickness or longitudinal dimension, and as shaped concave upwardly. Circular partition 34 is fixed in position, and gas leakage therearound is prevented, by rubber O-ring 36 which is disposed between the lower surface of partition 34 and shoulder 38 on the one hand, and the lower wall of chamber 28 on the other hand. Gas entering chamber 28 through inlet 32 must pass through partition 34, therefore, in order to enter analysis cell 18. As shown, the transverse section of the disk-shaped partition 34 is large with respect to its longitudinal dimension or thickness. Furthermore, partition 34 occupies a large proportion of chamber 28, the partition, as illustrated, occupying about half the volume of the chamber.

The means of this invention for supplying gas to be analyzed at predetermined temperature is illustrated as incorporated in an infra-red gas analyzer of known type arranged for the continuous analysis of a stream of gas. Thus, the analyzer is shown as having mounted on base 10 a pair of infra-red sources 40, 42, the beams from which may be interrupted or alternated by the interrupter member 44 actuated by motor 46. Comparison cell 48, which is parallel to analysis cell 18, is formed in member 50. Housing 52 contains passages 54 and 56, through which infra-red beams may pass into detector 58. In the detector 58 are chambers 60 and 62 connected by passage 64. Chambers 60 and 62 may contain bodies of gas separated by diaphragm 66. Condenser microphone 68 receives signals dependent upon the composition of the gas being analyzed, and such signals may be amplified, and also recorded. Windows 70, of infra-red transmitting material similar to windows 22 and 24, are provided for the passage of the infra-red beams.

For the operation of the known infra-red analyzer, such as here illustrated, reference may be had to Patent No. 2,648,775, mentioned hereinabove. The apparatus illustrated is of a type which exhibits rapid response, in continuous analysis, to changes in the composition of the gas being analyzed.

Returning now to the means of this invention for supplying gas to be analyzed to the analysis cell at predetermined temperature, the gas to be analyzed is received at a temperature determined by the source of supply, and enters inlet 32. From inlet 32 the gas enters preheating chamber 28 wherein it passes through sintered stainless steel partition 34 and is heated, goes through passage 30, enters analysis cell 18, and leaves cell 18 by way of outlet 20.

The remarkable efficacy of the gas preheating means shown may be illustrated in the manner described below. Thus, when the instrument is located in a room at ordinary room temperature, and base 10 has been heated by units 14 to a temperature about 140° F., the temperature of metal section 26 and sintered stainless steel partition 34 is within about 1° F. of the temperature of base 10.

Using a sintered stainless partition 28 of about ⅛ inch thickness and a mean pore size of about 35 microns, the partition 28 having a volume of about 1 cubic centimeter, in a preheating chamber 28 having a volume of about 2 cubic centimeters, the efficacy of heat transfer to incoming gas to be analyzed may be shown. The incoming gas may be air, entering inlet 32 at about 80° F. If the gas is to flow through the analysis cell 18 at the rate of about 1 liter per minute, and the temperature of porous partition 34 is 140° F., the gas, after passage through partition 34 will be heated to about 139.75° F. With a gas flow rate of 2 liters per minute, the other conditions remaining the same, the gas will be heated to about 139.5° F. by its passage through partition 34. Correspondingly, with a gas flow rate of 4 liters per minute, the gas will be heated to about 139° F. by its passage through partition 34. The above-mentioned gas flow rates are within the range normally encountered in gas analysis practice.

In the examples given in the preceding paragraph, the pressure drop in the gas resulting from its passage through sintered stainless steel partition is extremely low. Thus, at a gas flow rate of 1 liter per minute, the pressure of the gas after passing through partition 34 was lower by about ½ inch of water than its pressure in inlet 32; at a flow rate of 2 liters per minute, the corresponding gas pressure drop was equivalent to 1 inch of water; and at 4 liters per minute the pressure drop was about 2 inches of water.

Further referring to the two preceding paragraphs, at the gas flow rates mentioned, namely 1, 2 and 4 liters per minute, and with a preheating chamber 28 having a volume of only about 2 cubic centimeters, it will be clearly apparent that any given body of gas is in the preheating chamber only a small fraction of a second. Thus, in an analysis instrument which is quickly responsive to changes of composition of gas continuously passing therethrough, the means of the present invention is highly advantageous in affording undiminished speed of response.

By the present invention, therefore, there is provided simple and compact means, useful in analysis or measuring instruments of various types, which is highly advantageous for supplying gas to the instrument by reason of its effective imparting of predetermined temperature to the gas, its low pressure drop, and, because of the small volume of gas involved at any one time, its high speed of response to changes of gas composition.

By reason of the effective heat exchanging character of the means of this invention, it will be understood that said means may be utilized to decrease, as well as to increase, the temperature of the incoming gas being supplied to the measuring instrument.

As previously mentioned, the porous partition of the preheating chamber desirably is of sintered stainless steel, because of its non-corrosive character. The mean pore size of said partition may vary substantially depending upon particular circumstances, but generally speaking, a mean pore size of from about 10 to about 100 microns is practicable. The porous partition, however, may be composed of other sintered metal, for example copper, nickel, or copper-nickel alloys. In certain cases, the partition may be formed from iron or other metal turnings or borings bonded together by lead solder, and the porous partition may even be composed of heat conductive non-metallic material. Generally speaking, the material of the porous partition has good heat conductivity, as compared to materials, heat insulating in character, which have poor heat conductivity; and the advantages of the invention are exhibited when the porous partition is composed of any otherwise suitable material exhibiting good heat conductivity.

The metal enclosing the preheating chamber desirably is of stainless steel, because of its non-corrosive character, but other metals may be employed for this purpose. Likewise the metal enclosing the analysis chamber desirably, but not necessarily, is of stainless steel. While aluminum is desirable for the base, because of its high heat conductivity, other metals may be used therefor.

The O-ring or equivalent means for sealing the peripheral portions of the porous partition may be of suitable material other than rubber, for example, silicone polymers, or Teflon.

The preheating chamber may be disposed directly adjacent to the base, while still retaining certain of the advantages of the construction illustrated.

The size and proportions of the means of this invention may of course be varied widely depending upon the particular analysis instrument and circumstances involved.

Other variations may be utilized in carrying out the invention. Thus, the instrument may be arranged for continuous or non-continuous flow of gas to be measured, and in certain instances two or more preheating chambers may be arranged in series, such as when extremely close control of temperature is desired.

It will be appreciated that the means of this invention is not limited to association with infra-red gas analyzers, as illustrated herein, but may be utilized with a variety of other instruments for analyzing gases or measuring characteristics thereof.

It will be understood that various modifications may be made while still coming within the scope of the invention.

Having disclosed my invention, what I claim as new and desire to secure by Letters Patent of the United States is:

1. In gas analysis apparatus wherein gas is subjected to measurement in an analysis cell, means for supplying gas to be analyzed to said analysis cell at predetermined temperature comprising, in combination, members which may be maintained at a uniform temperature and which cooperate to enclose a gas heat exchanging chamber communicable with a gas supply and with said analysis cell, and a porous partition of good heat conductivity within said chamber and through which said gas must pass, said partition being in thermal contact with the members enclosing said chamber.

2. In gas analysis apparatus wherein gas is subjected to measurement in an analysis cell, means for supplying gas to be analyzed to said analysis cell at predetermined temperature comprising, in combination, metal members which may be maintained at a uniform temperature and which cooperate to enclose a gas heat exchanging chamber communicable with a gas supply and with said analysis cell, and a porous metal partition within said chamber and through which said gas must pass, said partition being in thermal contact with the metal enclosing said chamber.

3. In gas analysis apparatus wherein gas is subjected to measurement in an analysis cell, means for supplying gas to be analyzed to said analysis cell at predetermined temperature comprising, in combination, metal members which may be maintained at a uniform temperature and which cooperate to enclose a gas heat exchanging chamber communicable with a gas supply and with said analysis cell, and a porous metal partition within said chamber and through which said gas must pass, said partition being in thermal contact with the metal enclosing said chamber, the transverse section of said partition being large with respect to its longitudinal dimension.

4. In gas analysis apparatus wherein gas is subjected to measurement in an analysis cell, means for supplying gas to be analyzed to said analysis cell at predetermined temperature comprising, in combination, metal members which may be maintained at a uniform temperature and which cooperate to enclose a gas heat exchanging chamber communicable with a gas supply and with said analysis cell, and a porous metal partition within said chamber and through which said gas must pass, said partition being in thermal contact with the metal enclosing said chamber, the transverse section of said partition being large with respect to its longitudinal dimension, said chamber being shaped and dimensioned so that said partition occupies a large proportion thereof.

5. In gas analysis apparatus wherein gas is subjected to measurement in an analysis cell, means for supplying gas to be analyzed to said analysis cell at predetermined temperature comprising, in combination, a metal base maintainable at a uniform elevated temperature, metal members in thermal contact with said base and which cooperate to enclose a gas preheating chamber communicable with a gas supply and with said analysis cell, and a sintered metal partition within said preheating chamber and through which said gas must pass, said partition being in thermal contact with the metal enclosing said chamber.

6. In gas analysis apparatus wherein gas is subjected to measurement in an analysis cell, means for supplying gas to be analyzed to said analysis cell at predetermined temperature comprising, in combination, a metal base maintainable at a uniform elevated temperature, metal members in thermal contact with said base and which cooperate to enclose a gas preheating chamber communicable with a gas supply and with said analysis cell, and a sintered metal partition within said preheating chamber and through which said gas must pass, said partition being in thermal contact with the metal enclosing said chamber, the transverse section of said partition being large with respect to its longitudinal dimension.

7. In gas analysis apparatus wherein gas is subjected to measurement in an analysis cell, means for supplying gas to be analyzed to said analysis cell at predetermined temperature comprising, in combination, a metal base maintainable at a uniform elevated temperature, metal members in thermal contact with said base and which cooperate to enclose a gas preheating chamber communicable with a gas supply and with said analysis cell, and a sintered metal partition within said preheating chamber and through which said gas must pass, said partition being in thermal contact with the metal enclosing said chamber, the transverse section of said partition being large with respect to its longitudinal dimension, said chamber being shaped and dimensioned so that said partition occupies a large proportion thereof.

8. In gas analysis apparatus wherein gas is subjected to measurement in an analysis cell, in combination, a metal base maintainable at a uniform elevated temperature, a metal block in thermal contact with said base and shaped to enclose an analysis cell wherein the gas is subjected to measurement, a metal section in thermal contact with said block and cooperating to enclose a preheating chamber for the gas to be analyzed, said preheating chamber communicating with said analysis cell, and a sintered metal partition within said preheating chamber and through which the incoming gas must pass, said partition being in thermal contact with the metal members defining said preheating chamber.

9. In gas analysis apparatus wherein gas is subjected to measurement in an analysis cell, in combination, a metal base maintainable at a uniform elevated temperature, a metal block in thermal contact with said base and shaped to enclose an analysis cell wherein the gas is subjected to measurement, a metal section in thermal contact with said block and cooperating to enclose a preheating chamber for the gas to be analyzed, said preheating chamber communicating with said analysis cell, and a sintered metal partition within said preheating chamber and through which the incoming gas must pass, said partition being in thermal contact with the metal members defining said preheating chamber, the transverse section of said partition being large with respect to its longitudinal dimension.

10. In gas analysis apparatus wherein gas is subjected to measurement in an analysis cell, in combination, a metal base maintainable at a uniform elevated temperature, a metal block in thermal contact with said base and shaped to enclose an analysis cell wherein the gas is subjected to measurement, a metal section in thermal contact with said block and cooperating to enclose a preheating chamber for the gas to be analyzed, said preheating chamber communicating with said analysis cell, and a sintered metal partition within said preheating chamber and through which the incoming gas must pass, said partition being in thermal contact with the metal members defining said preheating chamber, the transverse section of said partition being large with respect to its longitudinal dimension, said chamber being shaped and dimensioned so that said partition occupies a large proportion thereof.

References Cited in the file of this patent
UNITED STATES PATENTS

| | | |
|---|---|---|
| 1,893,330 | Jones | Jan. 3, 1933 |
| 2,448,315 | Kunzog | Aug. 31, 1948 |
| 2,616,668 | Van Weenen et al. | Nov. 4, 1952 |
| 2,648,775 | Waters | Aug. 11, 1953 |
| 2,668,243 | Williams | Feb. 2, 1954 |
| 2,673,298 | Hutchins | Mar. 23, 1954 |

OTHER REFERENCES

Construction of a Dual Beam Heated Infrared Cell, Nue, Journal of the Optical Society of America, June 1953. volume 43, Number 6.